(12) United States Patent
Sakamoto et al.

(10) Patent No.: US 7,773,880 B2
(45) Date of Patent: Aug. 10, 2010

(54) OPTICAL ACCESS SYSTEM

(75) Inventors: Kenichi Sakamoto, Kokubunji (JP); Yoshihiro Ashi, Yokohama (JP); Tohru Kazawa, Kokubunji (JP); Ryosuke Nishino, Yokohama (JP); Masayuki Takase, Kokubunji (JP); Masahiko Mizutani, Kokubunji (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 12/076,897

(22) Filed: Mar. 25, 2008

(65) Prior Publication Data
US 2008/0181604 A1 Jul. 31, 2008

Related U.S. Application Data

(63) Continuation of application No. 11/346,467, filed on Feb. 3, 2006, now Pat. No. 7,369,768.

(30) Foreign Application Priority Data
Jul. 29, 2005 (JP) ............................. 2005-219907

(51) Int. Cl.
*H04B 10/00* (2006.01)

(52) U.S. Cl. ............................. 398/72; 398/66; 398/75; 398/52

(58) Field of Classification Search .................. 398/58, 398/66–72
See application file for complete search history.

(56) References Cited

U.S. PATENT DOCUMENTS

| | | | | | |
|---|---|---|---|---|---|
| 4,252,999 | A | * | 2/1981 | Acampora et al. | .......... 370/323 |
| 5,063,595 | A | * | 11/1991 | Ballance | ..................... 370/522 |
| 5,299,044 | A | * | 3/1994 | Mosch et al. | .................. 398/35 |

(Continued)

FOREIGN PATENT DOCUMENTS

JP 10-93607 9/1996

(Continued)

OTHER PUBLICATIONS

"Implementor's Guide for Recommendation G.983.1 B-PON", Internal ITU-T Document, pp. 1-6.

(Continued)

*Primary Examiner*—Agustin Bello
(74) *Attorney, Agent, or Firm*—Stites & Harbison, PLLC; Juan Carlos A. Marquez, Esq.

(57) ABSTRACT

An optical access system capable of avoiding cutoffs or interruption in the periodically transmitted signals that occur during the ranging time is provided. A first method to avoid signal cutoffs is to stop periodic transmit signals at the transmitter during the ranging period, and transmit all the periodic transmit signals together when the ranging ends, and buffer the signals at the receiver to prepare for ranging. A second method is to fix definite periods ahead of time for performing ranging, then cluster the multiple periodic transmit signals together in sets at the transmitter and send them, and then disassemble those sets back into signals at the receiver. The transmitting and receiving is then controlled so that the transmit periods do not overlap with the ranging periods. In this way an optical access system is provided that can send and receive signals requiring periodic transmissions without interruption even during ranging operation.

8 Claims, 17 Drawing Sheets

U.S. PATENT DOCUMENTS

| | | | |
|---|---|---|---|
| 5,559,624 A * | 9/1996 | Darcie et al. | 398/72 |
| 5,912,998 A * | 6/1999 | Quayle | 385/24 |
| 5,978,374 A * | 11/1999 | Ghaibeh et al. | 370/395.43 |
| 6,592,272 B1 * | 7/2003 | Masucci et al. | 398/47 |
| 6,647,210 B1 * | 11/2003 | Toyoda et al. | 398/102 |
| 6,650,839 B1 * | 11/2003 | Mallard et al. | 398/9 |
| 6,697,374 B1 * | 2/2004 | Marmur et al. | 370/458 |
| 6,771,908 B2 * | 8/2004 | Eijk et al. | 398/66 |
| 6,778,781 B2 * | 8/2004 | Van Eijk et al. | 398/100 |
| 6,868,232 B2 * | 3/2005 | Eijk et al. | 398/5 |
| 7,142,544 B2 * | 11/2006 | Kim et al. | 370/395.1 |
| 7,190,858 B1 * | 3/2007 | Greiner et al. | 385/37 |
| 7,260,119 B2 * | 8/2007 | Sala et al. | 370/510 |
| 7,366,196 B2 * | 4/2008 | Blahut et al. | 370/442 |
| 2002/0085492 A1 | 7/2002 | Mukai et al. | |
| 2002/0159120 A1 | 10/2002 | Kitayama et al. | |
| 2003/0027585 A1 * | 2/2003 | Ohnishi | 455/503 |
| 2003/0091045 A1 * | 5/2003 | Choi et al. | 370/390 |
| 2003/0142626 A1 | 7/2003 | Umayabashi et al. | |
| 2004/0085905 A1 * | 5/2004 | Lim et al. | 370/236.2 |
| 2004/0090980 A1 * | 5/2004 | Song et al. | 370/445 |
| 2004/0202470 A1 * | 10/2004 | Lim et al. | 398/51 |
| 2005/0013314 A1 * | 1/2005 | Lim et al. | 370/432 |
| 2007/0025735 A1 * | 2/2007 | Sakamoto et al. | 398/75 |
| 2008/0019697 A1 * | 1/2008 | Sala et al. | 398/99 |

FOREIGN PATENT DOCUMENTS

| | | |
|---|---|---|
| JP | 11-122279 | 10/1997 |
| JP | 11-146000 | 11/1997 |
| JP | 2002-198984 | 12/2000 |
| JP | 2003-224572 | 1/2002 |
| JP | 2003-318846 | 4/2002 |
| JP | 2003-283521 | 11/2002 |
| JP | 2003-244178 | 1/2003 |
| JP | 2005-033544 | 7/2003 |
| JP | 2005-33544 | 7/2003 |
| WO | WO 96/13915 | 5/1996 |

OTHER PUBLICATIONS

"A Broadband Optical Access System with Increased Service Capability Using Dynamic Bandwidth Assignment", Series G: Transmission Systems and Media, Digital Systems and Networks, International Telecommunication Union (Nov. 2001), 2 cover pages, pp. i-v, and 1-82.

"Draft Amendment to Carrier Sense Multiple Access with Collision Detection (CSMA/CD) Access Method and Physical Layer Specifications", IEEE Draft P802.3ah ™ /D3.3 (2002), pp. i-viii, and 469-525.

"Gigabit-Capable Passive Optical Networks (GPON): General Characteristics", Series G: Transmission Systems and Media, Digital Systems and Networks, International Telecommunication Union (Mar. 2003), 2 cover pages, pp. i-iii, and 1-14.

"Gigabit-Capable Passive Optical Networks (GPON): ONT Management and Control Interface Specification", Series G: Transmission Systems and Media, Digital Systems and Networks, International Telecommunication Union (Jun. 2004), 2 cover pages, pp. 1-110.

Japanese Office Action dated Jun. 10, 2008 regarding Japanese Application No. 2006-274608 in Japanese.

* cited by examiner

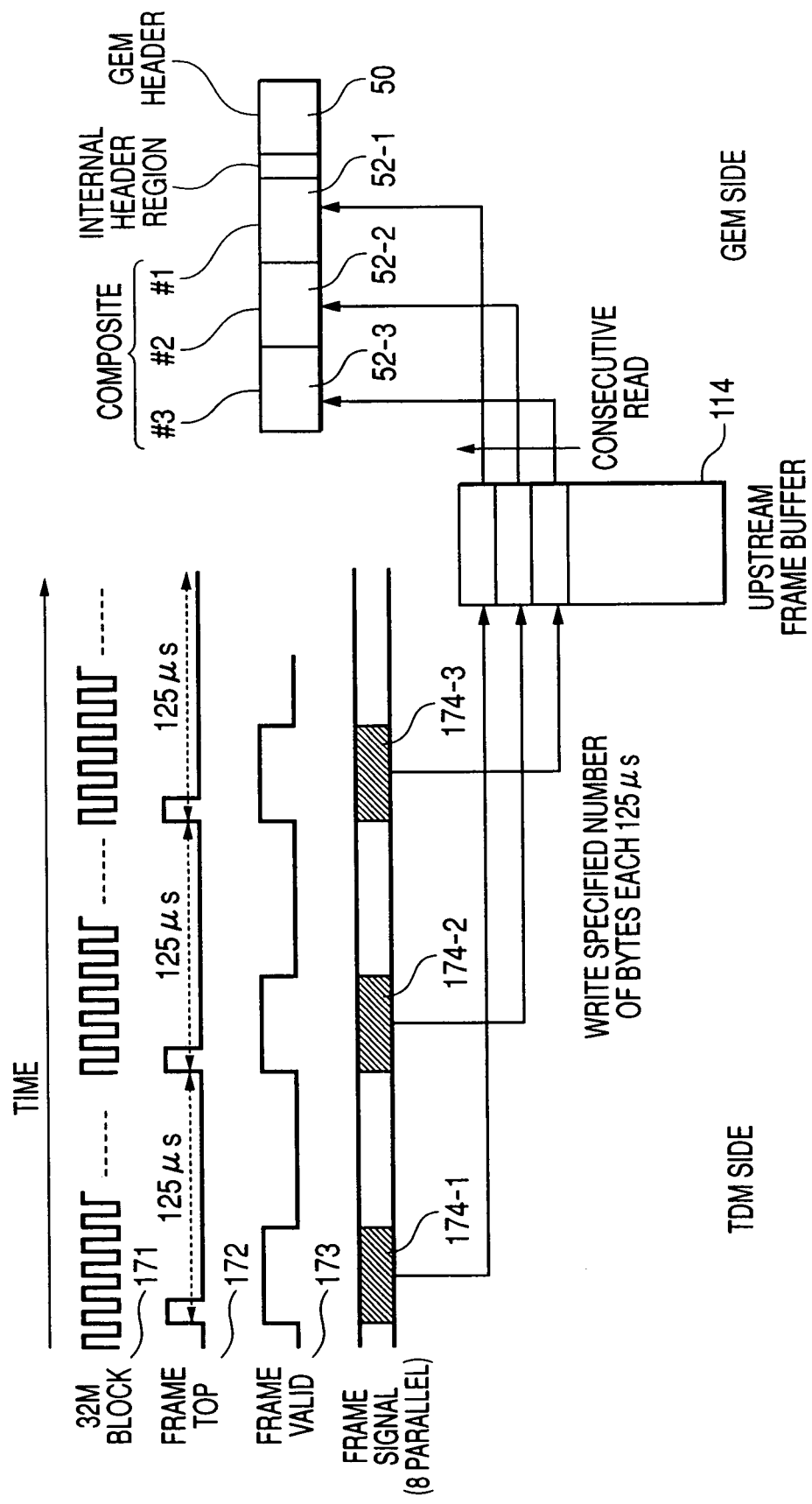

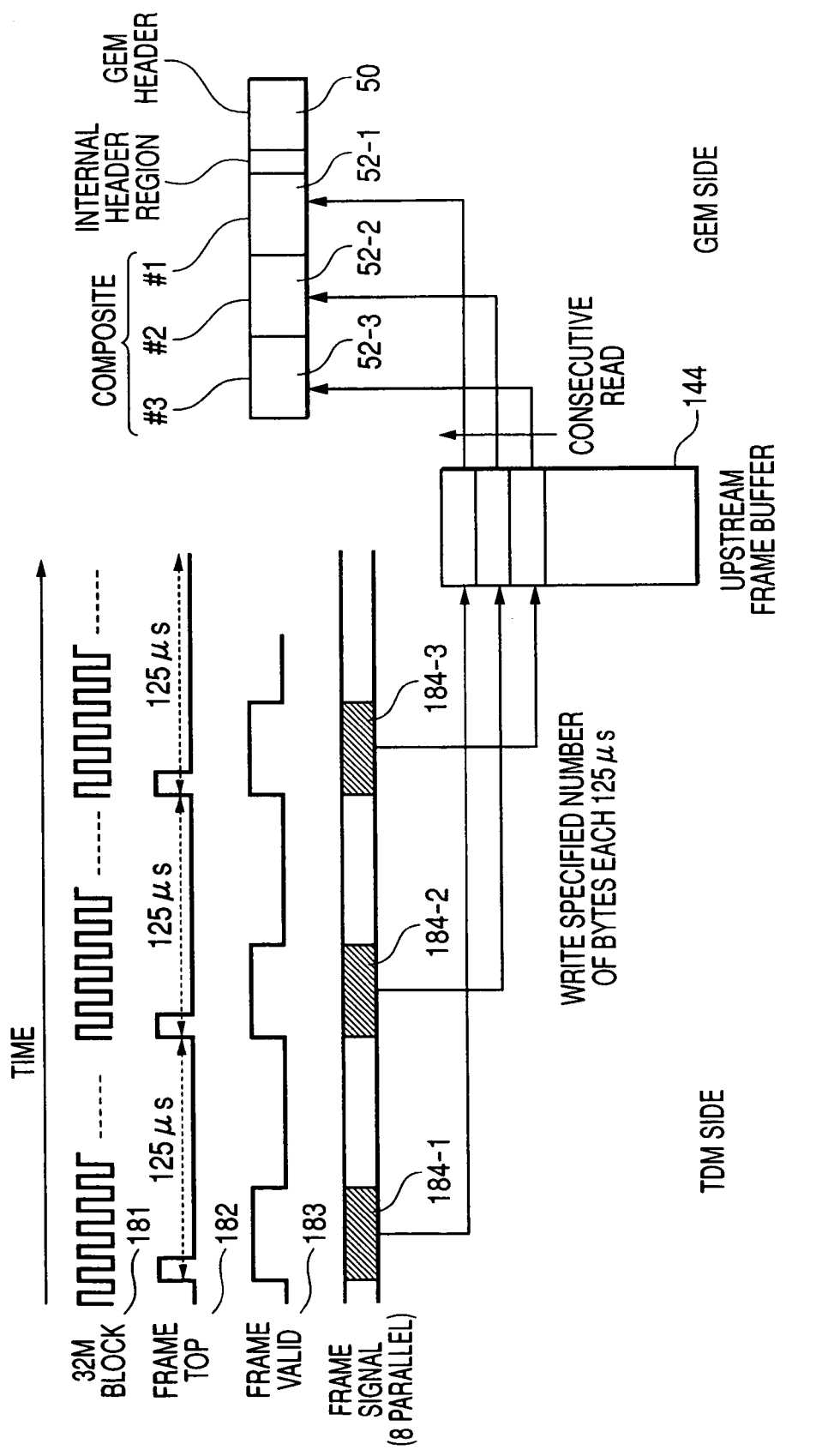

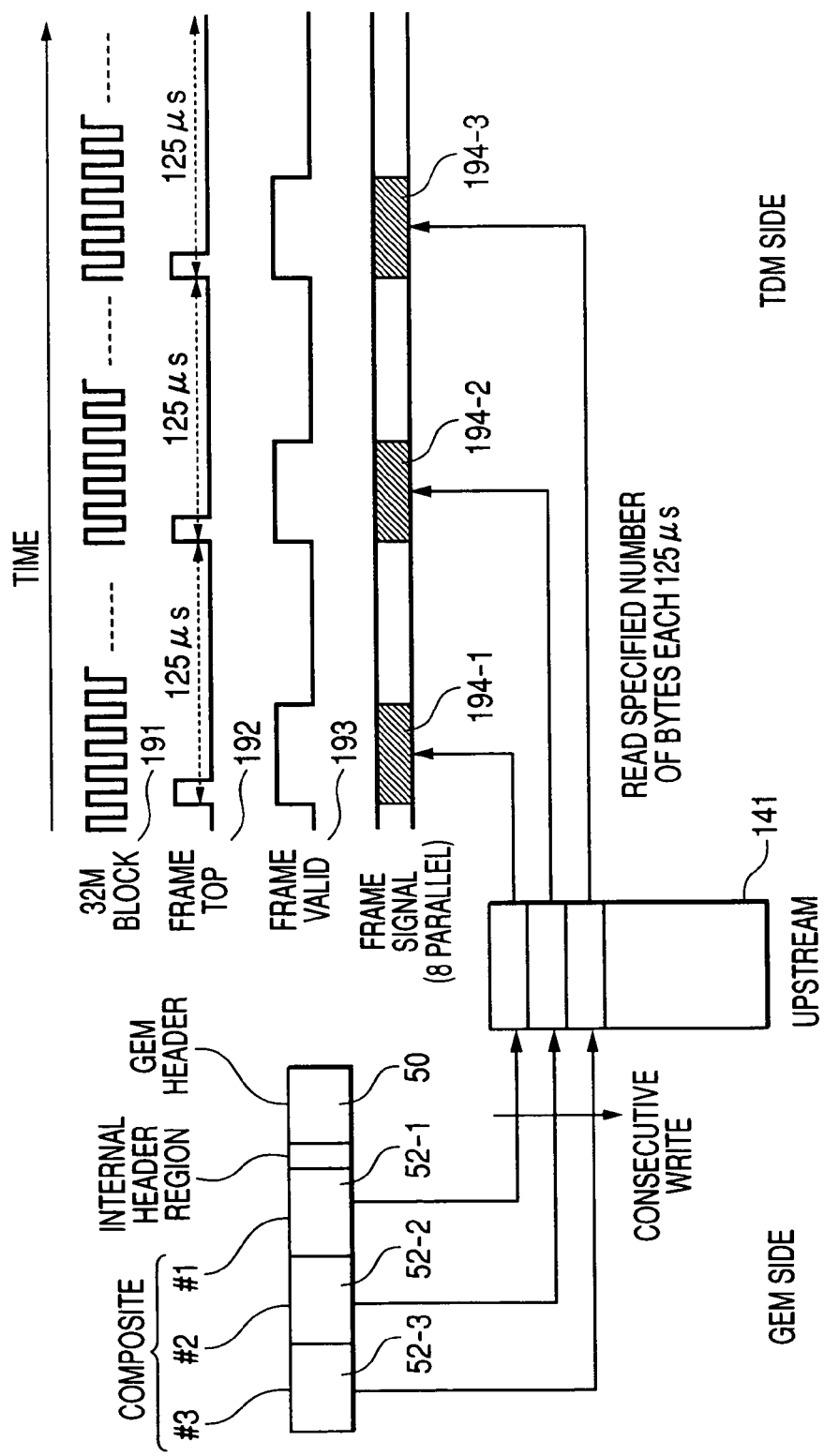

OPTICAL ACCESS SYSTEM

CROSS REFERENCE TO RELATED APPLICATIONS

This application is a Continuation application of U.S. application Ser. No. 11/346,467 filed Feb. 3, 2006 now U.S. Pat. No. 7,369,768. Priority is claimed based upon U.S. application Ser. No. 11/346,467 filed Feb. 3, 2006, which claims the priority date of Japanese Application No. 2005-219907 filed on Jul. 29, 2005, and which is hereby incorporated by reference.

FIELD OF THE INVENTION

The present invention relates to an optical access system for communication between a subscriber residence and a communication provider station.

BACKGROUND OF THE INVENTION

Telephone subscriber networks and ADSL have been utilized in access networks for storing user stations in public communications networks for forwarding data such as audio or video. Moreover optical access systems have become more widespread in recent years.

These optical access systems use a method for connecting the station and the subscriber in a one-to-one relationship, and a method for connecting in a one-to-x relationship. The PON (Passive Optical Network) method is known as one-to-x connection method.

In the PON method, data communication is performed by sharing bandwidth between an OLT (Optical Line Terminal) and multiple ONT (Optical Network Terminal) by assigning one upstream and one downstream optical wavelength. In communication between the ONT and OLT, the downstream optical signal from the OLT heading towards the ONT is divided by a splitter, and the signal just for that particular ONT is extracted. In communication with the upstream signal, the OLT notifies the ONT of the transmission timing, and the ONT then transmits the signal to the OLT at that timing so that communication between the OLT and multiple ONT jointly on one wavelength.

Optical access methods of this type include: B-PON (Broadband PON) (See ITU-T Recommendation G.983.1, G.983.4), GE-PON (Giga-bit Ethernet PON) (See IEEE IEEE802.3ah), and G-PON (Generic PON) (See ITU-T Recommendation G.984.1, G.984.4) systems.

Signals communicated through PON systems are non-periodic signals such as webs and mail traffic over internet and periodic type signals conveyed by conventional telephone systems and leased line networks. The latter or periodic type signals (TDM: Time Division Multiplexing) have a fixed period (short-period frame) of 125 µs, and the signal is sent at a fixed bandwidth by transmitting a fixed amount of bytes within this fixed period. The signal must be sent each 125 µs period and no timing jitter is allowed.

SUMMARY OF THE INVENTION

In the PON system however, the distance between the ONT and OLT is not always a fixed distance. So the distance between the ONT and OLT must be measured periodically and the transmit timing of the ONT upstream signal must be corrected (This measurement and correction operation is called ranging.). When the distances between the OLT and ONT for example are distributed between 20 to 40 kilometers, the maximum allowable distance differential is 20 kilometers. To measure the distance of OLT and ONUs, the time of ranging (a ranging window) is up to 250 µs.

During the time of this measurement, only the frames for ranging are transmitted, then user's communications must be stopped during this time.

As described above, the periodic signal such as TDM signals required for a signal transmission at each 125 µs. The problem is that the ranging is performed and user signal is stopped for 250 µs, periodic signal communication becomes impossible and the signal is lost.

In a first aspect of this invention to resolve the above problems, the transmit signals are buffered (temporarily stored) at the transmitter during the ranging time and the signals then sent together when the ranging ends. Since some signals might not arrive during the ranging time, while no ranging is taking place, the receiver buffers ahead of time those TDM signals that are sent during the ranging time, and then transmits these buffered signals so that no interruption in communications will occur.

In a second aspect of this invention to resolve the above problems, long-period frames that are X-number of times larger than the short-period frames are utilized, and the ranging timing fixed at a specified position on the long-period frame. The communication signals are then clustered into multiple short-period frames ahead of time at the transmitter, assembled as composite frames and transmitted. These composite frames are then disassembled at the receiver, attached to a 125 µs signal and transmitted towards the next communications device. Communication interruptions can then in this way be avoided by scheduling the transmission timing of these composite frames so as not to conflict with the ranging timing.

This invention can therefore provide an optical access system capable of transmitting signals requiring periodic transmission without interruptions in communication even during the ranging operation.

BRIEF DESCRIPTION OF THE DRAWINGS

FIG. 15 is a block diagram of the signal processing in the downstream TDM GEM terminator device for the OLT of this invention;

FIG. 16 is a block diagram of the signal processing in the upstream TDM GEM terminator device for the ONT of this invention; and FIG. 17 is a block diagram of the signal processing in the downstream TDM GEM terminator device for the ONT of this invention.

DETAILED DESCRIPTION OF THE PREFERRED EMBODIMENTS

Figure 1:
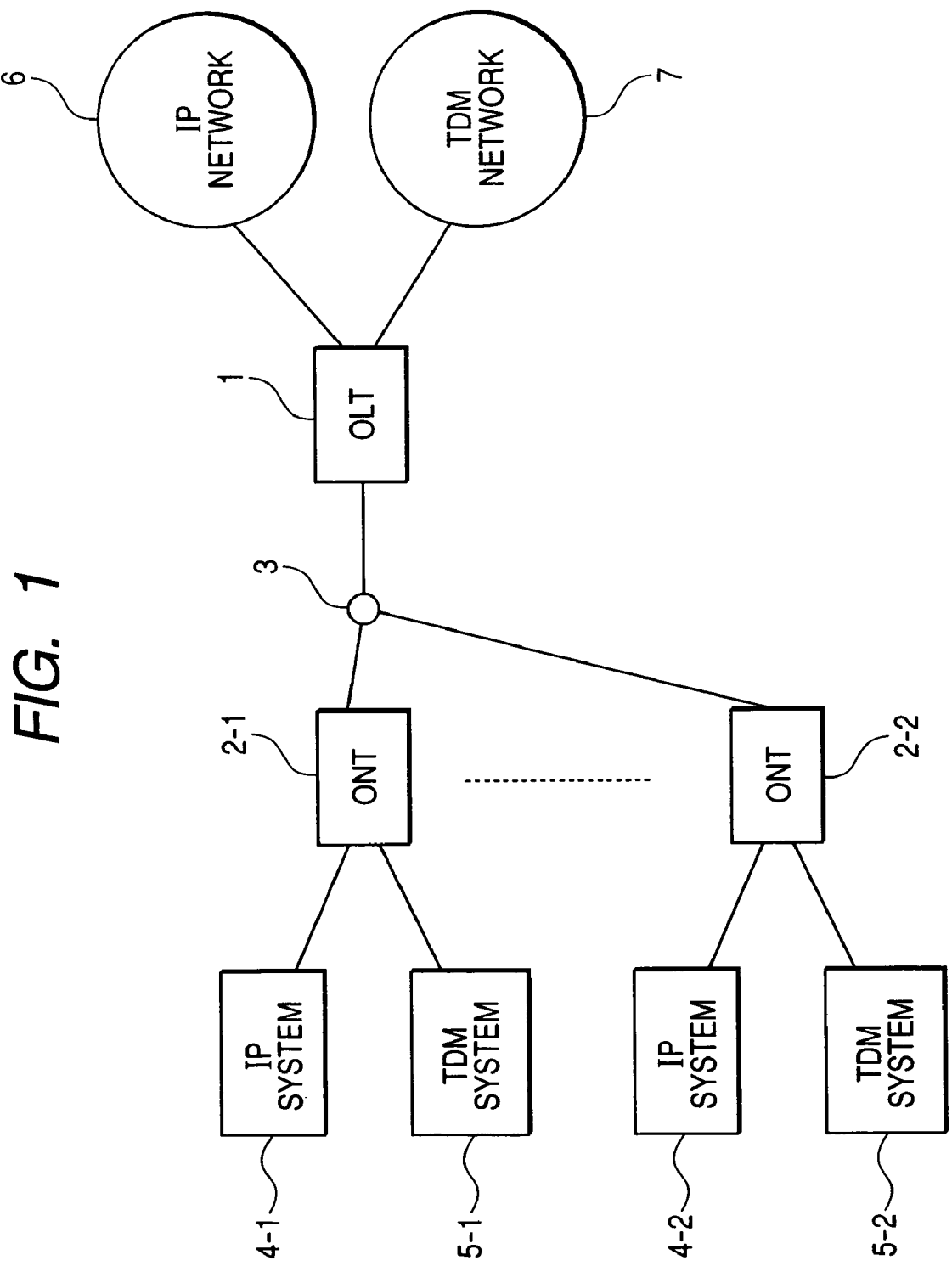
FIG. 1 is a drawing of the embodiment of the optical access network system of this invention.

FIG. 1 is a drawing showing the first embodiment of the optical access network system of this invention. The optical access network system is configured between the OLT-1 and the ONT 2-1, ONT 2-2. The OLT connects to each ONT via a splitter 3. At least one among the ONT 2 is connected to the IP system 4 and the TDM system 5. The OLT connects to the IP network 6 and the TDM network 7. TDM signals from the TDM system 5 are stored into the TDM network 7 via the optical network. Signals from the IP system 4 are stored in the IP network 6 via the optical network.

Figure 13:
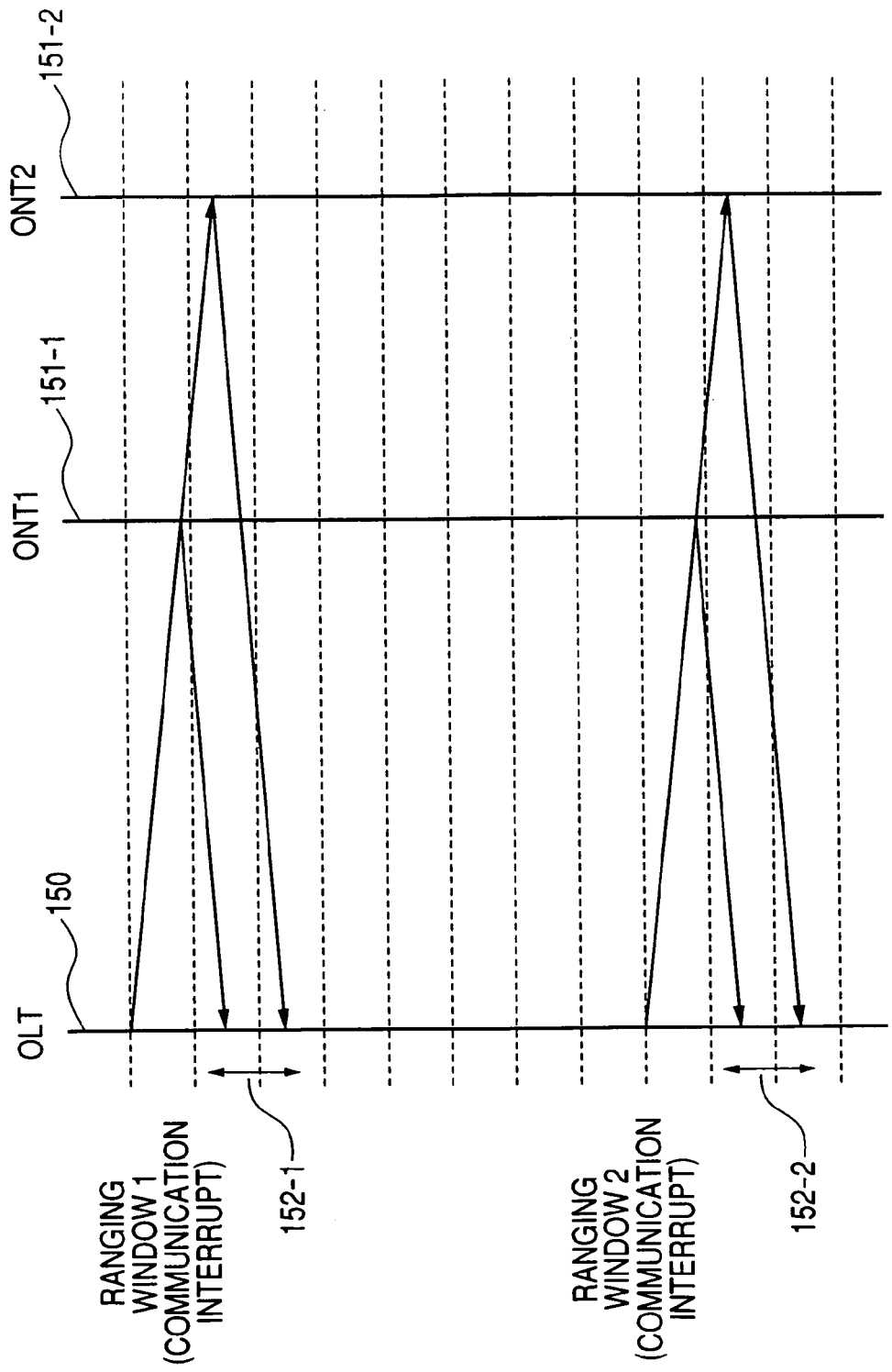
FIG. 13 is a drawing for describing the ranging method.

The ranging is described next using FIG. 13. Ranging is a process for measuring the distance between the OLT and ONT in order to correct the phase of the upstream signal. Ranging starts from the OLT and is performed by immediately returning the signal at each ONT. The ranging window 152 is the time in which ranging is performed and during this time, communication interruptions occur. In this invention, time-division multiplex signals can still be sent and received even during the communication interruption time that is characteristic of optical access systems.

Figure 2:
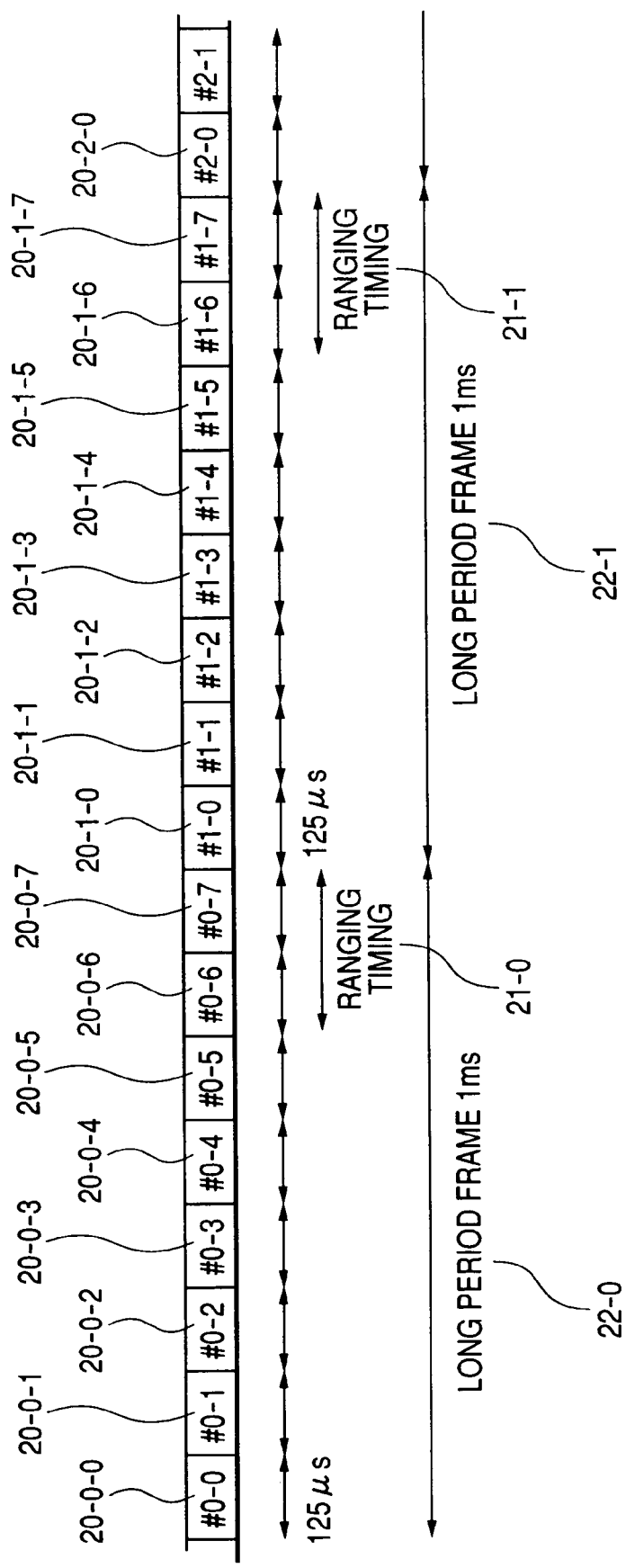
FIG. 2 is an example of the frame timing of this invention.

FIG. 2 is an example of the transmission frame timing in the optical access system of this invention. Short-period frames each 125 μs long are utilized for communication between the OLT 1 and ONT 2. Communication is performed multiplexing multiple packets called GEM within these short-period frames 20. This embodiment utilizes a 1 ms long-period frame 22 of multiple frames, and a range timing 21 is fixed to the frame 22. Here, the term "fixed" indicates performing ranging at a fixed timing on the long-period frame period. In this example, the long-period frame is eight times longer than the short-period frame, and the range timing is fixed to No. 6 20-0-6 and No. 7 20-0-7 within this long-period frame. By fixing the range timing 21 to the long-period frame 22, it is possible to predict when the communications will be cut off (interrupted).

Figure 3:
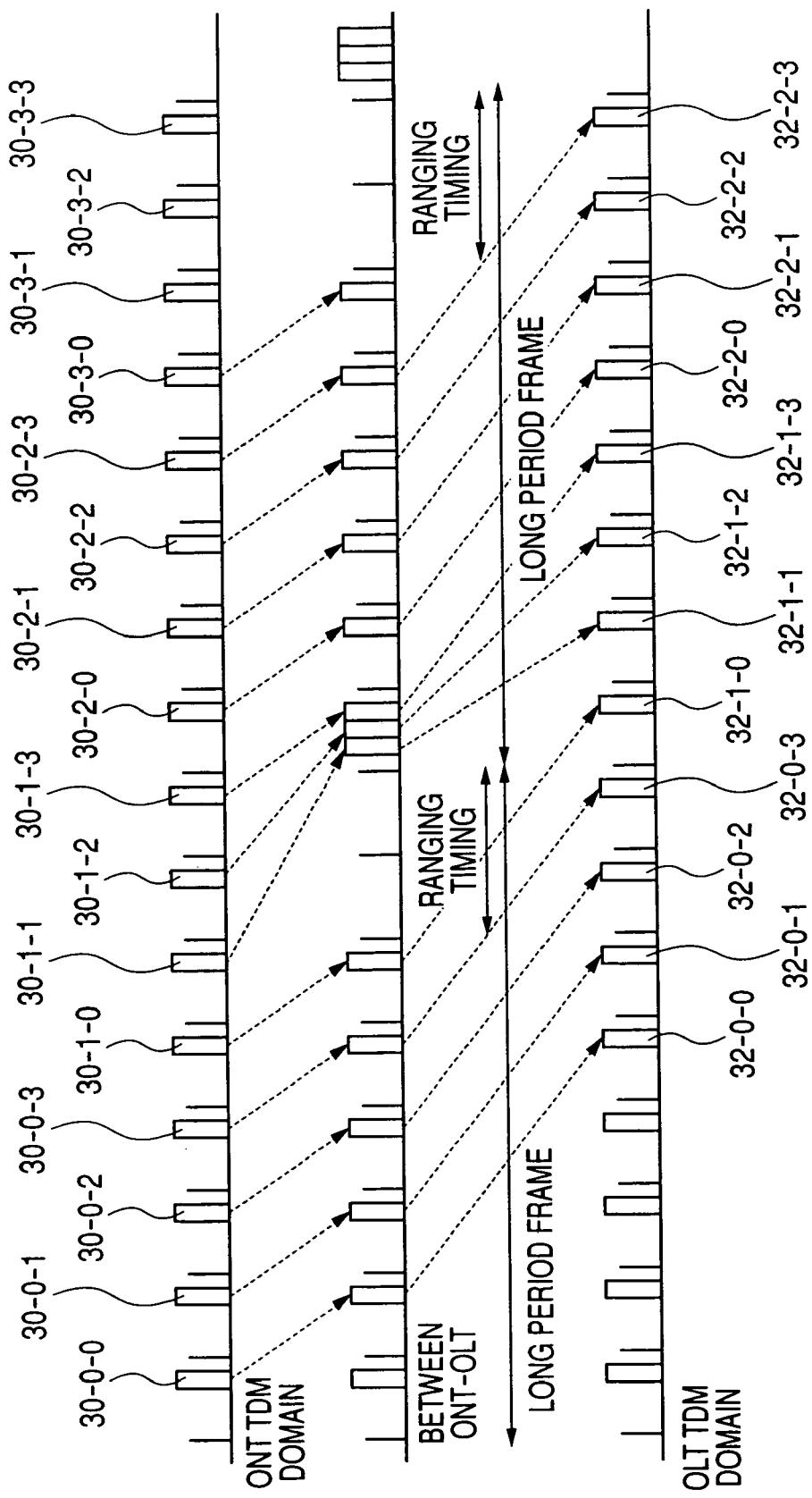
FIG. 3 is one example of the signal transmit/receive timing of this invention.

FIG. 3 is one example of the signal transmit frame timing in the optical access system of this invention. In this example, the communication is cut off during the range timing so that a two frame portion of the TDM signal is buffered in advance on the receive side device (OLT in the case of this figure) to prepare for ranging, and the communication interruption is avoided by sending the TDM signal from the buffer within that range timing.

Figure 4:
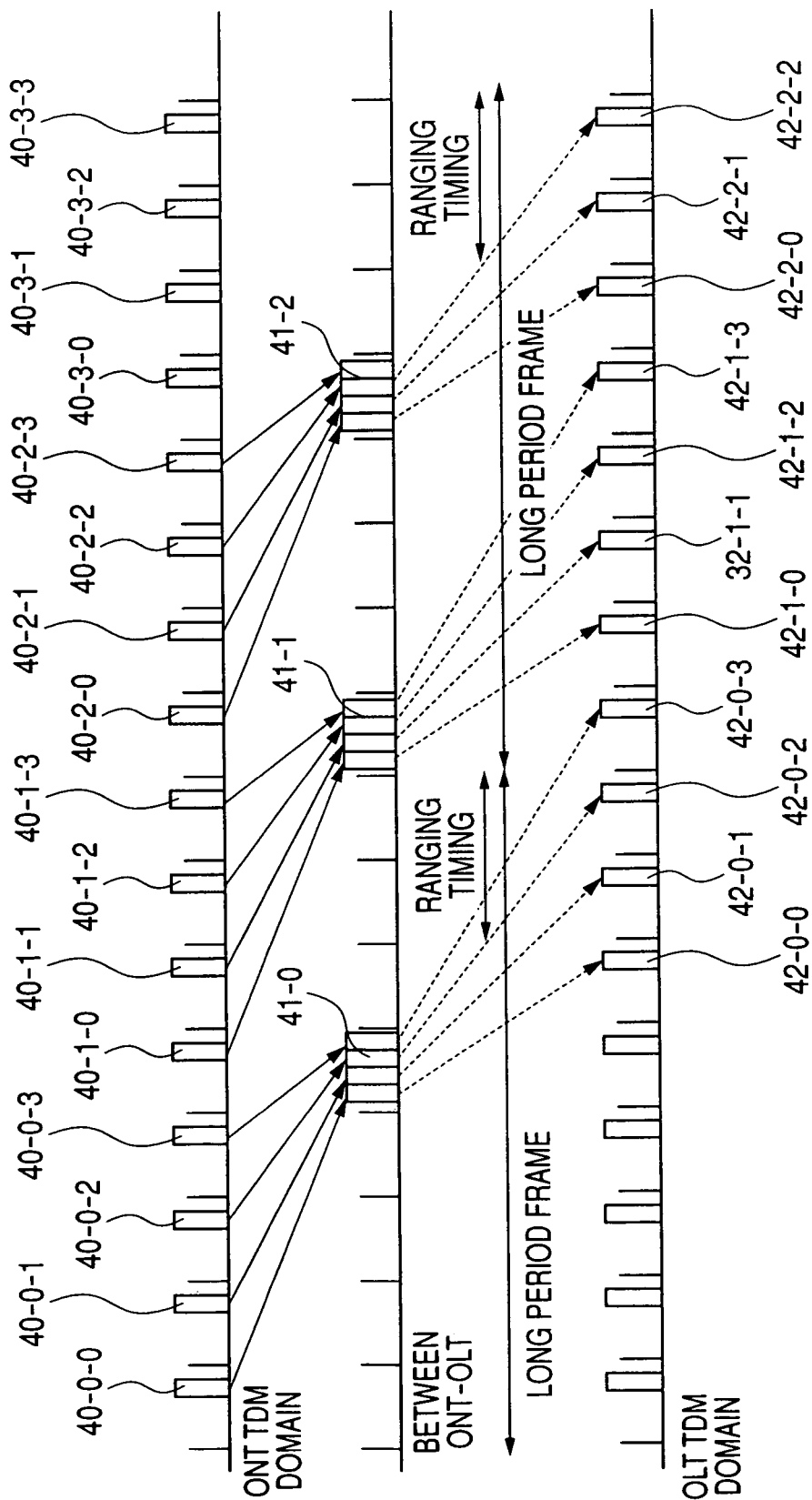
FIG. 4 is one example of the signal transmit/receive timing of this invention.

FIG. 4 is one example of the signal transmit/receive frame timing of the optical access system of this invention. The composite method is used in this example. The composite method is a method in which a TDM signal made up of a fixed number of x frames are constantly buffered on the transmit side device, and sent together as GEM. In this figure, ONT is the transmit side device, and OLT 1 is the receive side device. The TDM signals 40 arrive periodically at the ONT 2. The ONT 2 buffers and then clusters these signals side-by-side in groups of four each, and consistently transmits them in groups of four as a GEM in the same short-period frame towards the OLT 1. The OLT 1 disassembles this GEM and transmits each short-period frame as a TDM signal. In this example, the 1 ms long-period frame is a group of four frames so if composite packets 41 are transmitted in the first and fifth or the second and sixth short-period frames inside the long-period frame, then the composite packets 41 can be transmitted while avoiding the ranging timing fixed at the seventh and eighth (short-period frames) so that communication interruptions can be avoided.

Figure 5:
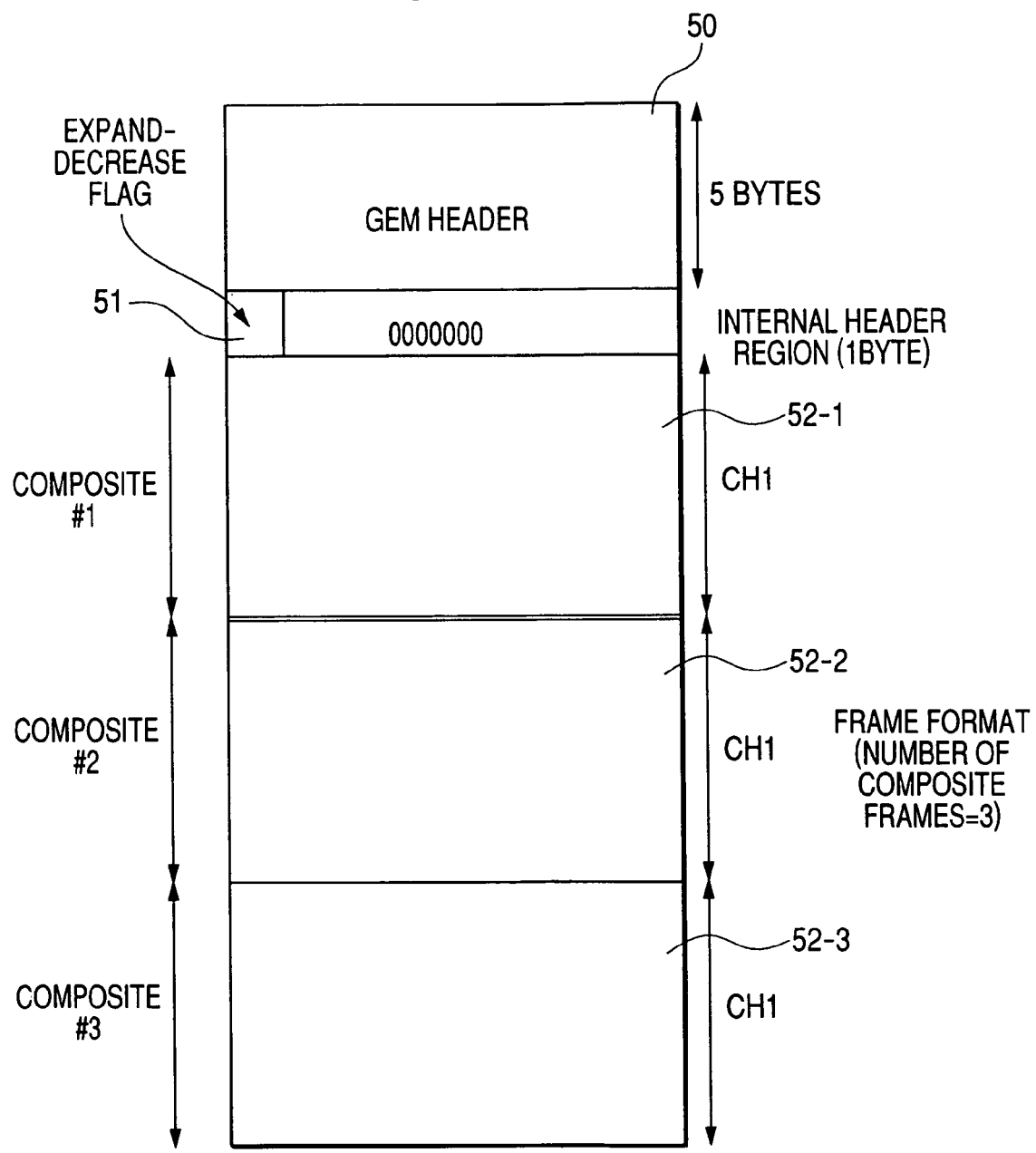
FIG. 5 is an example of the transmit/receive packet format of this invention.

FIG. 5 is an example of the composite packet of this invention. This drawing shows the case where the composites are equivalent to three time slots. The composite TDM signals 52 are multiplexed to the rear of the GEM header 50. An expand-decrease flag 51 is a field for communicating information relating to expansion or reduction. This expand-decrease flag 51 is sometimes utilized for expanding or reducing the number of TDM channels for the applicable ONT 2.

Figure 6:
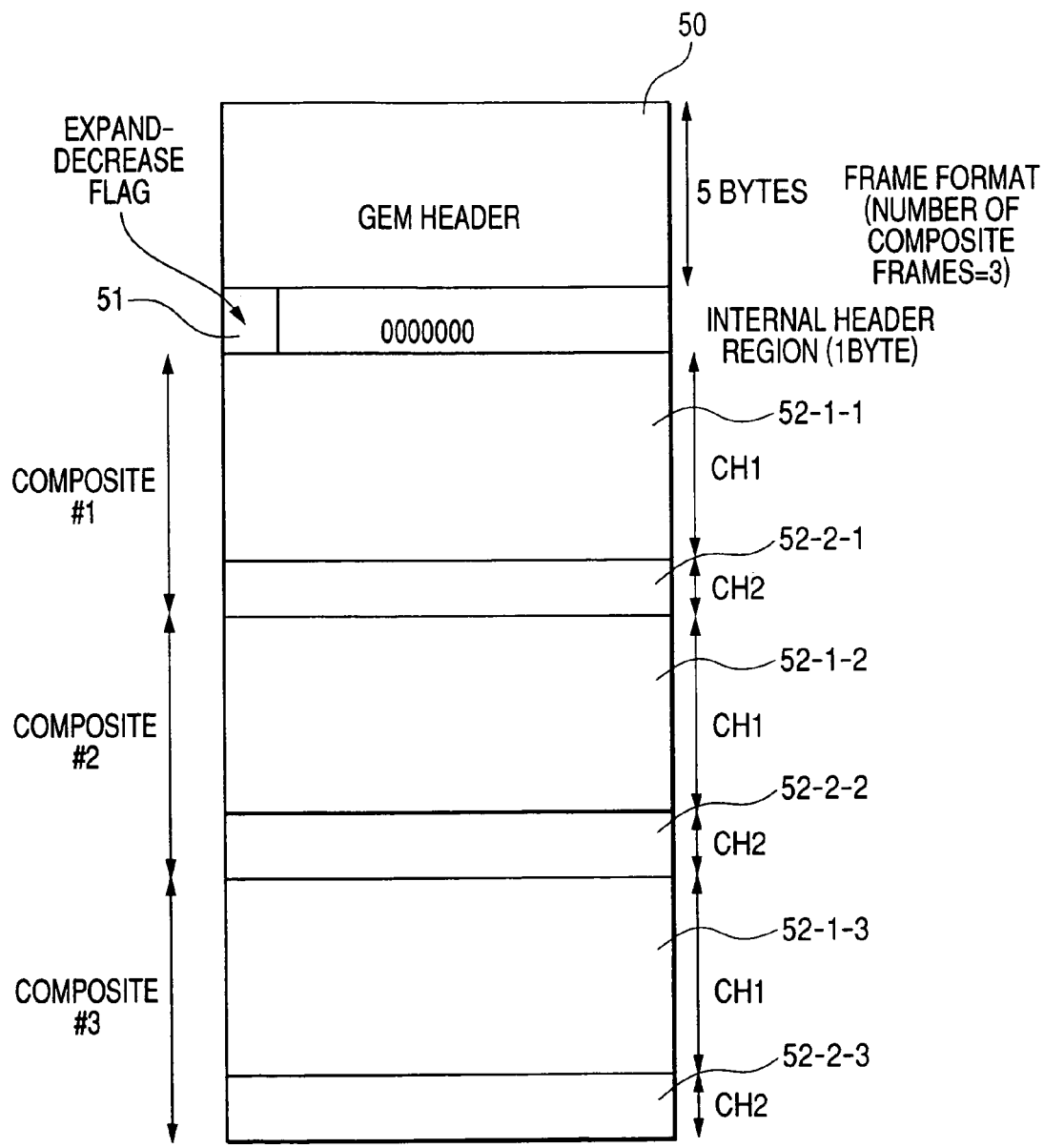
FIG. 6 is an example of the transmit/receive packet format of this invention.

FIG. 6 is an example of a composite packet. This drawing shows the case where the composites are equivalent to three time slots. This drawing also shows the case in which two TDM channels are assigned to the applicable ONT 2. Signals for CH1 52-1 and CH2 52-2 are alternately loaded in three frames in the same GEM. The expand-decrease flag 51 is a field for communicating information relating to expansion or reduction. This expand-decrease flag 51 is sometimes utilized for expanding or reducing the number of TDM channels for the applicable ONT 2.

Figure 7:
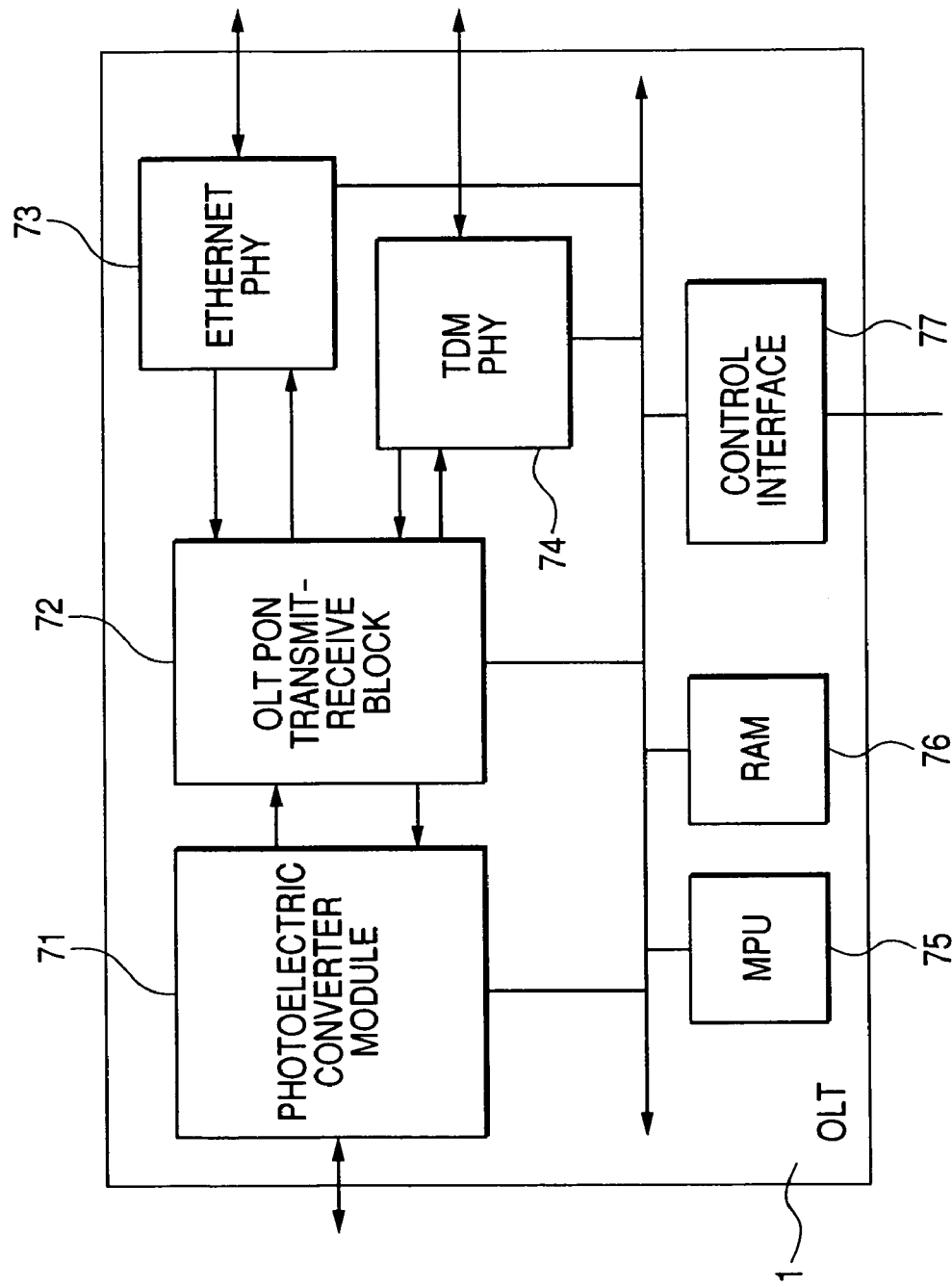
FIG. 7 is an example of the optical line terminal (OLT) of this invention.

FIG. 7 is a block diagram showing the structure of the OLT 1 in this invention. Upstream signals arriving from the optical access network are converted to electrical signals in the photoelectric converter module 71, and next GEM-terminated in the OLT PON transmit/receiver block 72, then converted to Ethernet frames and TDM signals, and sent respectively to the Ethernet PHY 73 and the TDM PHY 74, and transmitted to the IP network 6 and the TDM signal network 7. Downstream signals arriving from the Ethernet PHY 73 and the TDM PHY 74 are first respectively received at the Ethernet PHY 73 and TDM PHY 74, and next assembled into GEM frames in the OLT PON transmit/receiver block 72, and then transmitted via the photoelectric converter module 71 to the optical network 7. An MPU 75 and RAM 76, and control interface 77 are a microcomputer for controlling the OLT, a RAM, and a setup interface for making external settings to the OLT.

Figure 8:
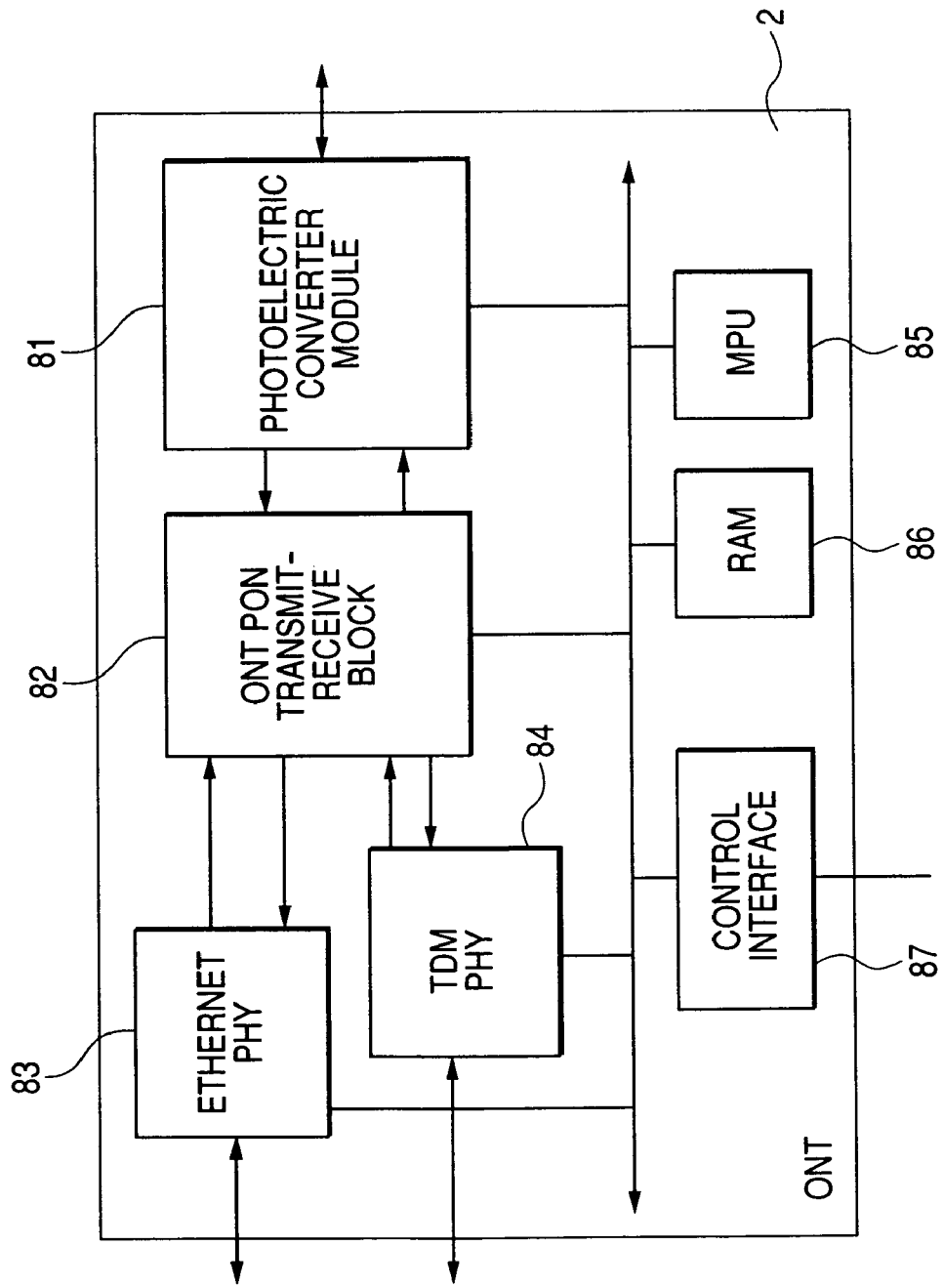
FIG. 8 is an example of the subscriber optical network terminal (ONT) of this invention.

FIG. 8 is a block diagram showing the structure of the ONT 1 of this invention. Downstream signals arriving from the optical access network are converted into electrical signals by the photoelectric converter module 81, GEM-terminated by the ONT PON transmit/receiver block 82, then converted to Ethernet frames and TDM signals, and sent respectively to the Ethernet PHY 83 and the TDM PHY 84, and transmitted to the IP system 4 and the TDM system 5. After the upstream signals arriving from the IP system 4 and the TDM system 5 are received respectively at the Ethernet PHY 83 and the TDM PHY 84, they are assembled into GEM frames in the ONT PON transmit/receiver block 82, and then transmitted via the photoelectric converter module 81 to the optical network 7. An MPU 85 and RAM 86 and control interface 87 are a microcomputer for controlling the ONT, a RAM, and a setup interface for making external settings to the ONT.

Figure 9:
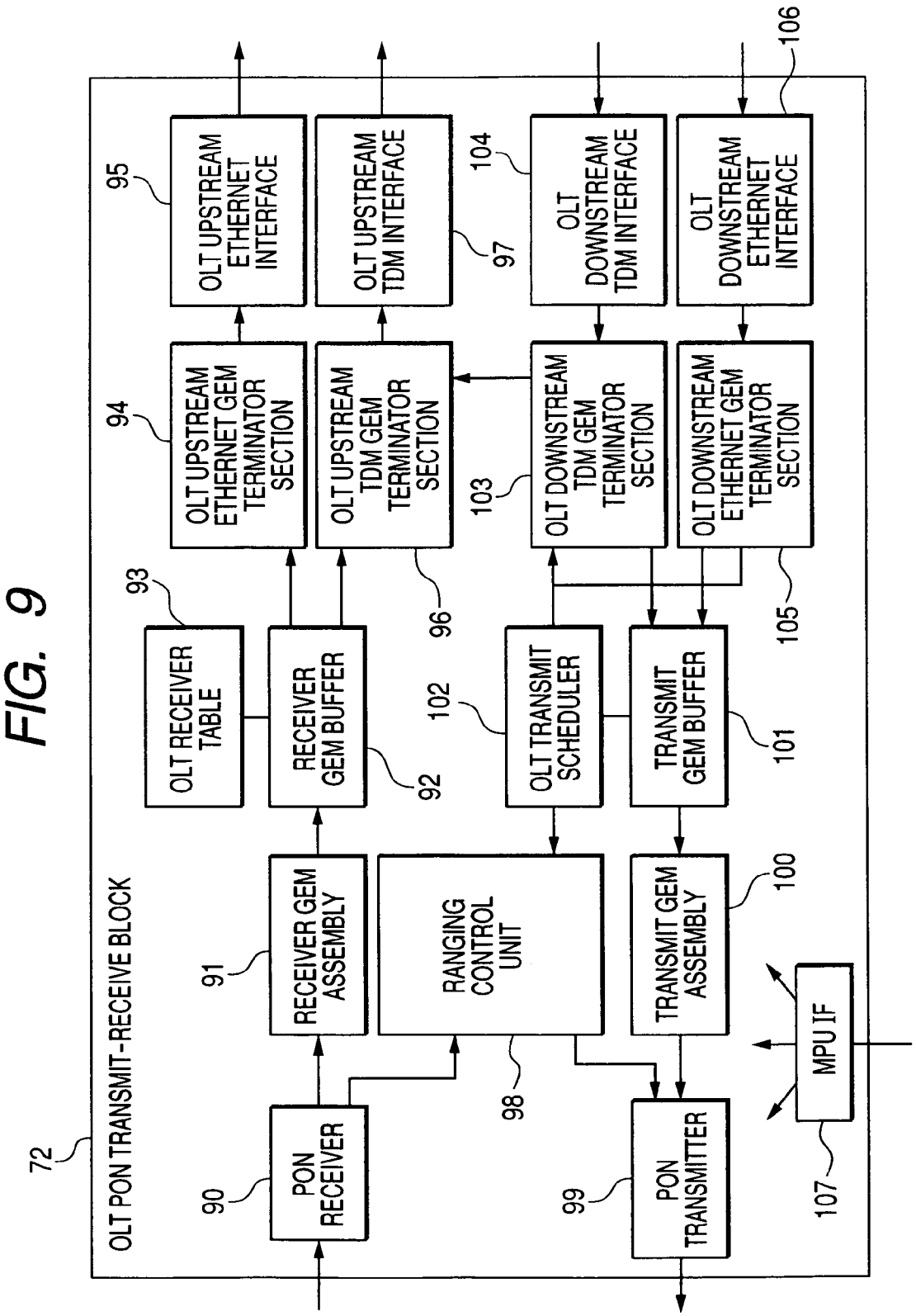
FIG. 9 is an example of the PON transmit/receive block for the OLT of this invention.

FIG. 9 is a block diagram showing in detail the structure of the OLT PON transmit/receiver block 72. The upstream signals from the photoelectric converter module 71 arrive at the PON receiver 90. Here, after synchronizing and GEM extraction are performed, the signals divided into multiple transmitted short-period frames are GEM assembled in the receiver GEM assembly 91. After then storing them in the receiver GEM buffer 92, they are assigned to the OLT upstream Ethernet GEM terminator section 94 and the OLT upstream TDM GEM terminator section 96 according to table information in the OLT receive table 93. The Ethernet frames are transmitted via the OLT upstream Ethernet interface 95 to the Ethernet PHY 73. The TDM signals are extracted from (TDM) composite packets by the OLT upstream TDM GEM terminator section 96, and sent at the desired timing via the OLT upstream TDM interface 97, to the TDM PHY 84.

The downstream signals are received as TDM signals from the OLT downstream TDM interface 104, and the OLT downstream TDM GEM terminator section 103 buffers (temporarily stores) the TDM signals and assembles them into composite frames. The Ethernet frames are received from the OLT downstream Ethernet interface 106, and the OLT downstream Ethernet GEM terminator section 105 then generates the GEM. The OLT downstream Ethernet GEM terminator section 105 then periodically loads the (TDM) composite GEM from the OLT downstream TDM GEM terminator section 103, at the available timing according to instructions from the OLT transmit scheduler 102. After the transmit GEM assembly 100 generates headers via the transmit GEM buffer 101, the PON transmitter 99 transmits the GEM frames. When performing ranging, the ranging control unit 98 starts ranging with a ranging signal at the timing allowed by the OLT transmit scheduler 102, and the PON transmitter 99 sends the ranging signals. A reply from ONT 2 then returns to the ranging control unit 98 via the PON receiver 90 to complete the ranging.

Figure 10:
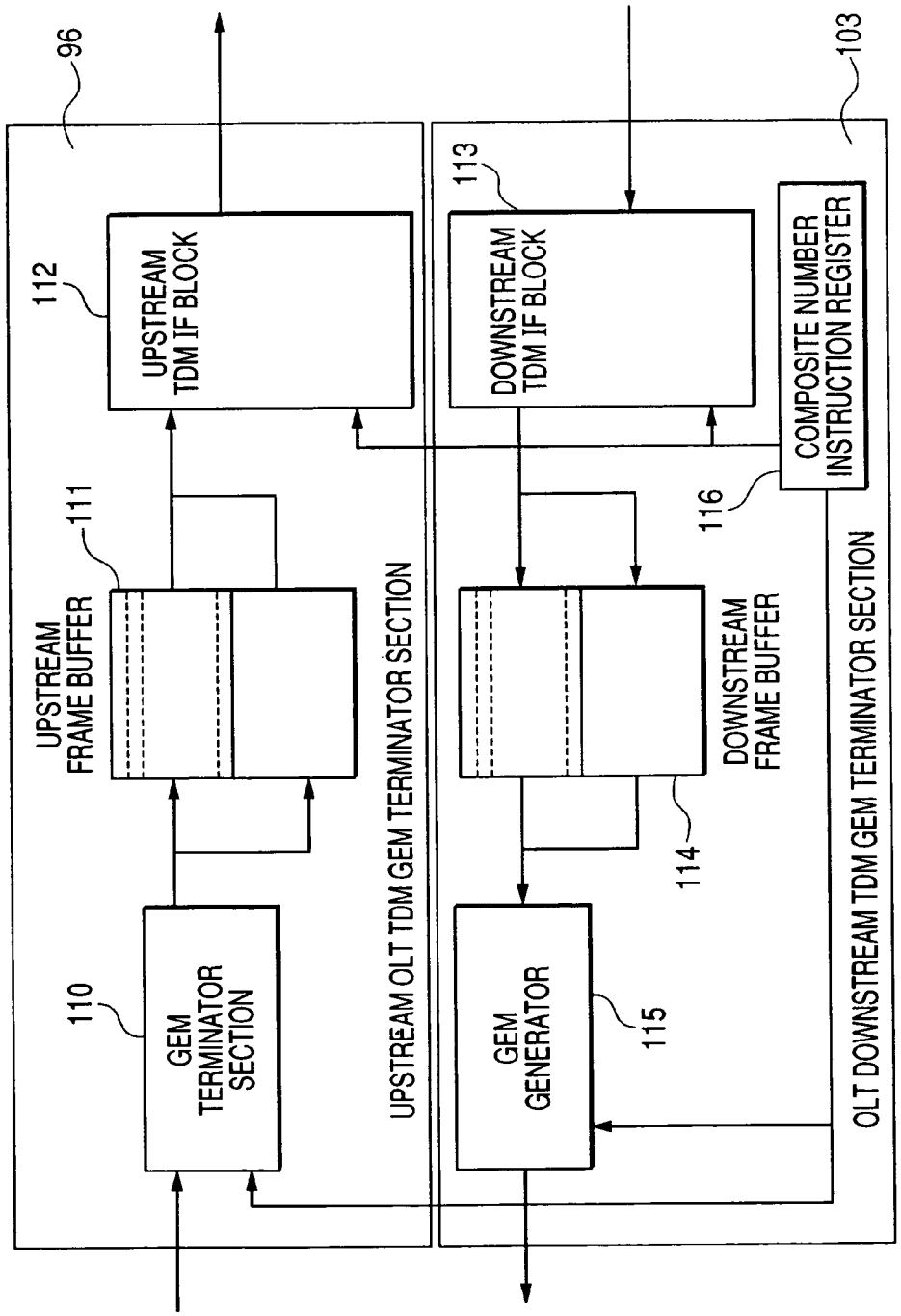
FIG. 10 is an example of the TDM GEM terminator devices for the OLT of this invention.

FIG. 10 is a block diagram showing the structure of the OLT upstream TDM GEM terminator section 96 and the OLT downstream TDM GEM terminator section 103. After the GEM terminator section 110 deletes the GEM headers of upstream receiver GEM holding the TDM signals, a payload section is written on the upstream frame buffer 111. The upstream TDM IF block 112 reads out (or loads) the TDM signals according to values in the composite number instruction register 116 and transmits them every 125 µs. These TDM signals headed downstream arrive at the downstream TDM IF block 113 every 125 µs, and those signals are then written in the downstream frame buffer 114. The storage position in the memory is at this time set according to the value in the composite number instruction register 116. The GEM generator 115 assembles the specified number of composite frames according to values in the composite number instruction register 116, attaches a GEM header and transmits the frames.

Figure 14:
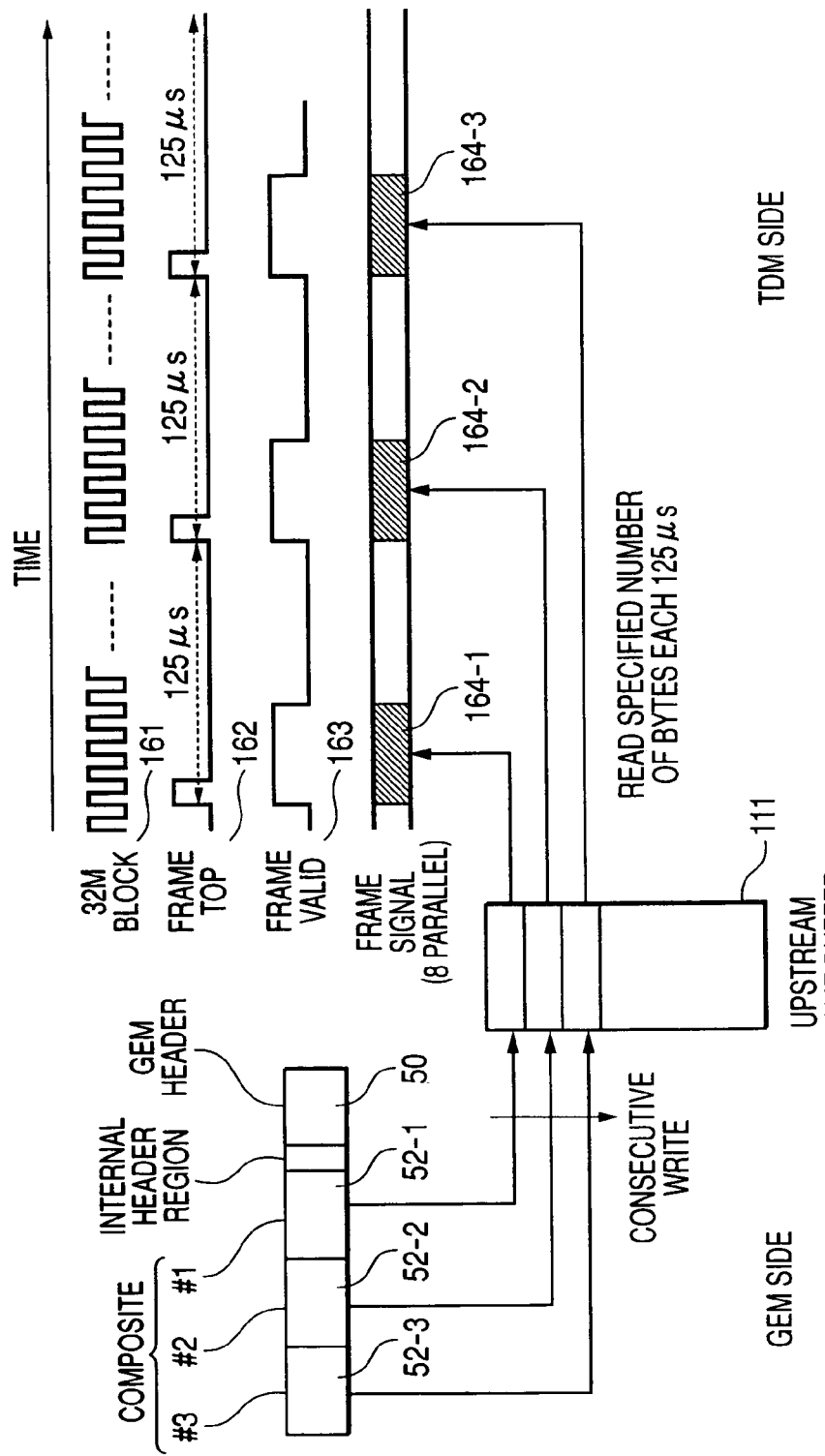
FIG. 14 is a block diagram of the signal processing in the upstream TDM GEM terminator device for the OLT of this invention.

FIG. 14 is a drawing showing the method for disassembling GEM frames and generating TDM frames in the OLT upstream TDM GEM terminator section 96. After receiving the composite GEM frames (of TDM signals), the OLT upstream TDM GEM terminator section 96 deletes the GEM header 50 and internal header region, and consecutively writes the payload 52 for the composite frame in fields on the upstream frame buffer 111. The upstream TDM IF block 112 generates 125 µs period frames 162 at the clock 161 (32 MHz in this example), and the arriving composite TDM signals respectively mapped as 164-1 through 3 and transmitted at 125 is period each. The frame valid signal 163 flows in parallel with the frame at this time and indicates whether the TDM signal is valid or invalid. The TDM PHY 74 receives this signal, and a TDM signal is sent here by mapping in SDH frames.

FIG. 15 is a drawing showing the method for receiving TDM frames and generating GEM frames in the OLT downstream TDM GEM terminator section 103.

The mapped signal comprised of SDH frames received at the TDM PHY 74 is converted here to a signal flowing in parallel with a clock signal 171, a frame top signal 172, and a frame valid signal 173 and these signals are input to the OLT downstream TDM GEM terminator section 103. These signals arriving every 125 µs are each written in a specified number of bytes on a specified region of the downstream frame buffer 114. When the writing ends and the GEM generator 115 finishes generating the internal header region and GEM headers, the signals are loaded (read-out) as a consecutive number of composites from the upstream frame buffer 114, and GEM frames are generated. These frames are sent to the transmit GEM buffer and transmitted to the PON domain.

Figure 11:
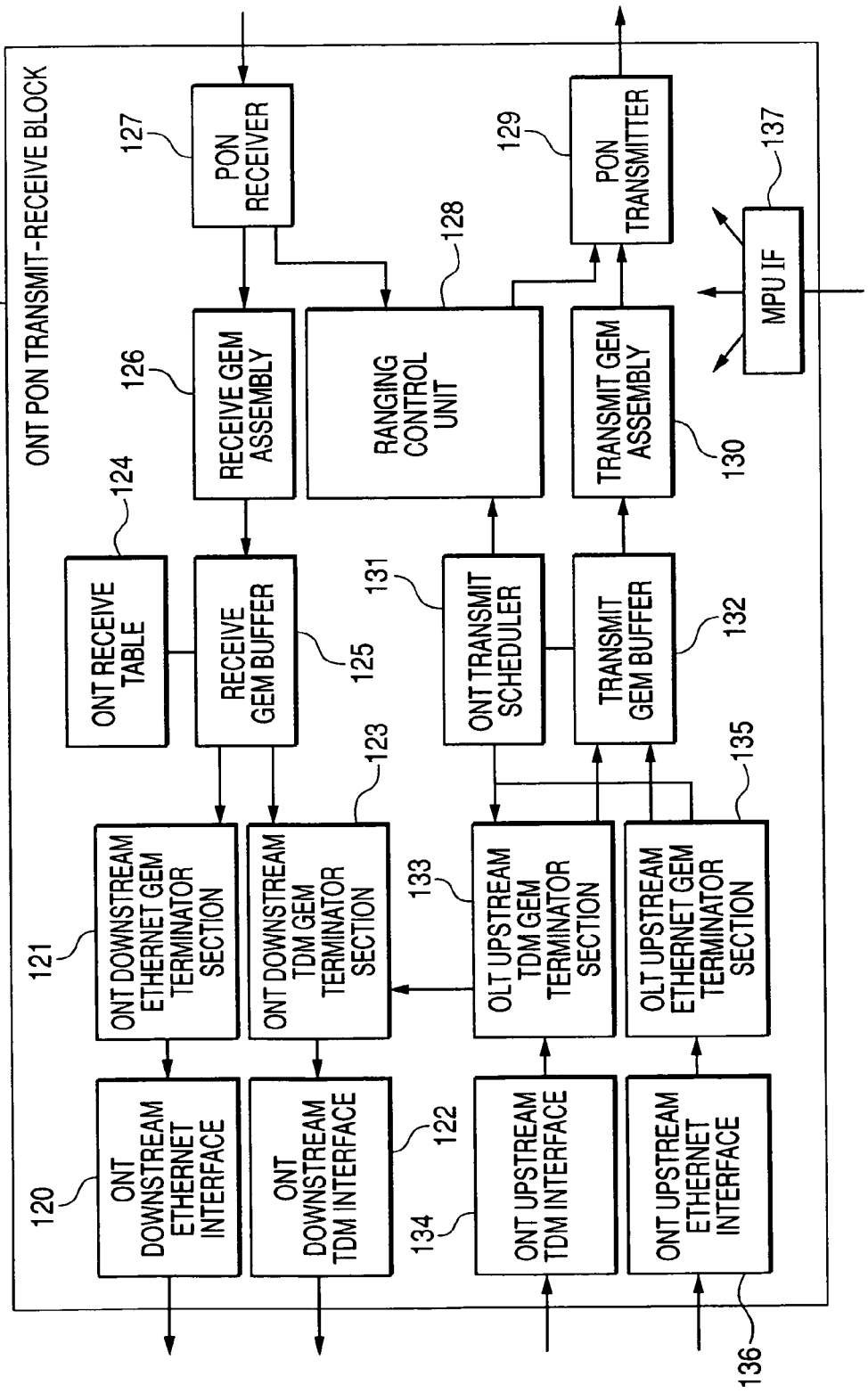
FIG. 11 is an example of the PON transmit/receive block for the ONT of this invention.

FIG. 11 is a block diagram showing the ONT PON transmit/receiver block 82. The downstream signal arrives at the PON receiver 127 from the photoelectric converter module 71. Here, after synchronizing and GEM extraction are performed, the signals divided into multiple transmitted short-period frames are GEM assembled in the Receive GEM assembly 126. After then storing them in the receiver GEM buffer 125, they are assigned to the ONT upstream Ethernet GEM terminator section 121 and the ONT upstream TDM GEM terminator section 123 according to table information in the ONT receive table 124. The Ethernet frames are transmitted via the ONT upstream Ethernet interface 120 to the Ethernet PHY 83. The TDM signals are extracted from (TDM) composite packets by the ONT downstream TDM GEM terminator section 123, and sent at the desired timing via the ONT upstream TDM interface 122, to the TDM PHY 84.

The upstream signals are received as TDM signals from the ONT upstream TDM interface 134, and the ONT upstream TDM GEM terminator section 133 buffers (temporarily stores) the TDM signals and assembles them into composite frames. The Ethernet frames are received from the ONT upstream Ethernet interface 136, and the ONT upstream Ethernet GEM terminator section 135 then generates the GEM. The ONT upstream Ethernet GEM terminator section 135 then periodically loads the (TDM) composite GEM from the ONT upstream TDM GEM terminator section 133 at the available timing according to instructions from the OLT transmit scheduler 131. After the transmit GEM assembly 130 generates headers via the transmit GEM buffer 132, the PON transmitter 129 transmits the GEM frames.

When ranging is requested, the ranging control unit 128 processes the ranging request signal received at the PON receiver 127, and the ONT 2 completes the ranging process by sending the ranging receive signal back via the PON transmitter 129.

Figure 12:
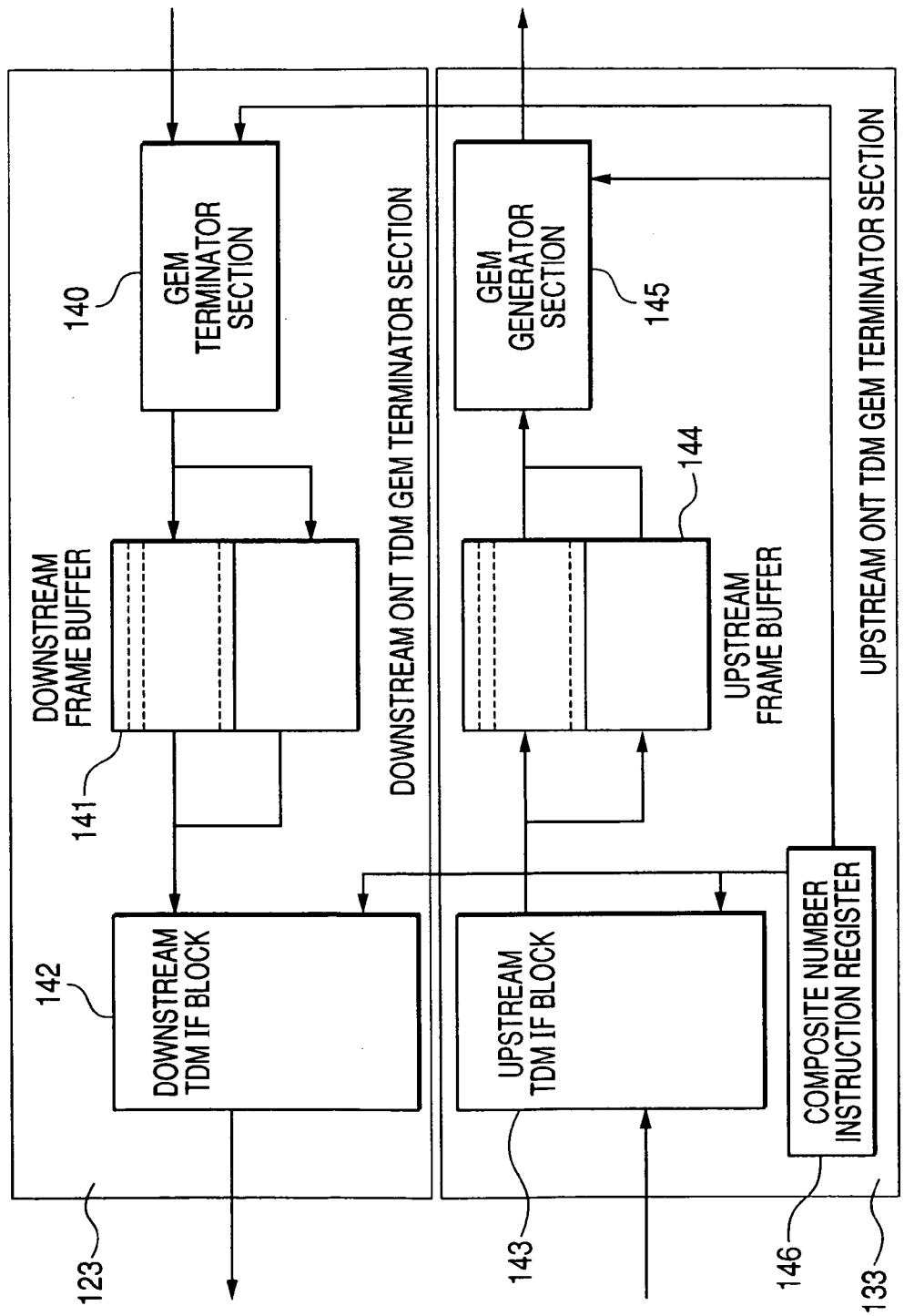
FIG. 12 is an example of the TDM GEM terminator devices for the ONT of this invention.

FIG. 12 is a block diagram showing the structure of the ONT downstream TDM GEM terminator section 123 and the ONT upstream TDM GEN terminator section 133. After the GEM terminator section 140 deletes the GEM headers of downstream receiver GEM holding the TDM signals, a payload section is written on the downstream frame buffer 141. The downstream TDM IF block 142 reads out (or loads) the TDM signals according to values in the composite number instruction register 146 and transmits them every 125 µs. These TDM signals headed upstream arrive at the upstream TDM IF block 143 every 125 µs, and those signals are then written in the upstream frame buffer 144. The storage position in the memory is at this time set according to the value in the composite number instruction register 146. The GEM generator 145 assembles the specified number of composite frames according to values in the composite number instruction register 146, attaches a GEM header and transmits the frames.

FIG. 16 is a drawing showing the method for receiving TDM frames and generating GEM frames in the ONT upstream TDM GEM terminator section 133. The mapped TDM signal received as SDH frames at the TDM PHY 84 is converted here to a signal flowing in parallel with a clock signal 181, a frame top signal 182, and a frame valid signal 183, and these signals are input to the upstream TDM IF block 143. These signals arriving every 125 μs are each written in a specified number of bytes on a specified region of the downstream frame buffer 141. When the writing ends and the GEM generator 145 finishes generating the internal headers and GEM headers, the signals are loaded (read-out) as a consecutive number of composites from the upstream frame buffer 144, and GEM frames are generated. These frames are sent to the transmit GEM buffer and transmitted to the PON domain.

FIG. 17 is a drawing showing the method for disassembling the GEM frames and generating TDM frames in the ONT downstream TDM terminator section 123. After receiving the composite GEM frames (of TDM signals), the ONT downstream TDM terminator section 123 deletes the GEM header 50 and internal header region, and consecutively writes the payload 52 for the composite frame in fields on the upstream frame buffer 141. The downstream TDM IF block 142 generates 125 μs period frames 192 at the clock 191 (32 MHz in this example), and transmits the arriving composite TDM signals respectively mapped as 194-1 through 3, every 125 μs. The frame valid signal 193 flows in parallel with the frame at this time and indicates whether the TDM signal is valid or invalid. The TDM PHY 84 receives this signal and by mapping in frames such as T1, a TDM signal is sent at this point.

What is claimed is:

1. An optical access system, comprising:
   an optical network terminal connected to a user terminal,
   an optical line terminal connected to the optical network terminal and a network, wherein the optical access system transmits to the network time-division multiplexed signals sent from the user terminal via the optical network terminal and the optical line terminal using cyclic frames,
   the optical access system performs a ranging during a ranging time period for measuring a distance between the optical line terminal and the optical network terminal,
   when the optical network terminal transmits the time-division multiplexed signals received from the user terminal to the network via the optical line terminal using the cyclic frames, the optical network terminal stores signals of the time-division multiplexed signals that would be transmitted to the optical line terminal using the cyclic frames during time cycles of a storing time period that includes the ranging time period and that is either equal to or longer than the ranging time period, and transmits the signals of the time-division multiplexed signals that would be transmitted to the optical line terminal using the cyclic frames during the time cycles of the storing time period during a time cycle that is subsequent to the storing time period, and
   when the optical line terminal transmits the time-division multiplexed signals received from the optical network terminal to the network, the optical line terminal transmits the time-division multiplexed signals in a continuous periodic manner using the cyclic frames by temporally storing the signals of the time-division multiplexed signals which are transmitted from the optical network terminal during the time cycle that is subsequent to the storing time period, sequentially transmitting the signals of the time-division multiplexed signals that are transmitted from the optical network terminal during the time cycle that is subsequent to the storing time period, and, during the ranging, transmitting to the network to be signals of the time-division multiplexed signals which were transmitted from the optical network terminal before the storing time period.

2. The optical access system according to claim 1, wherein the ranging is performed periodically.

3. An optical line terminal connected to an optical network terminal and a network, the optical line terminal transmitting to the network time-division multiplexed signals transmitted from the user terminal connected to the optical network terminal and received via the optical network terminal,
   wherein the optical line terminal receives the time-division multiplexed signals from the optical network terminal using cyclic frames,
   the optical line terminal performs a ranging during a ranging time period for measuring a distance between the optical line terminal and the optical network terminal, and
   when the optical line terminal transmits the time-division multiplexed signals received from the user terminal via the optical network terminal to the network, the optical line terminal transmits the time-division multiplexed signals in a continuous periodic manner using the cyclic frames by temporally storing signals of the time-division multiplexed signals which are transmitted from the optical network terminal during a time cycle that is subsequent to a storing time period that includes the ranging time period and that is either equal to or longer than the ranging time period and which would be transmitted from the optical network terminal during time cycles of the storing period using the cyclic frames, sequentially transmitting the signals of the time-division multiplexed signals that are transmitted from the optical network terminal during the time cycle that is subsequent to the storing time period, and during the ranging, transmitting to the network signals of the time-division multiplexed signals which were transmitted from the optical network terminal before the storing time period.

4. The optical line terminal according to claim 3, wherein the ranging is performed periodically.

5. An optical access system, comprising:
   an optical network terminal connected to a user terminal,
   an optical line terminal connected to the optical network terminal and a network, wherein the optical access system transmits to the user terminal time-division multiplexed signals sent from the network via the optical line terminal and the optical network terminal using cyclic frames,
   the optical access system performs a ranging during a ranging time period for measuring a distance between the optical line terminal and the optical network terminal,
   when the optical line terminal transmits the time-division multiplexed signals received from network to the user terminal via the optical network terminal using the cyclic frames, the optical line terminal stores signals of the time-division multiplexed signals that would be transmitted to the optical network terminal using the cyclic frames during time cycles of a storing time period that includes the ranging time period and that is either equal to or longer than the ranging time period, and transmits the signals of the time-division multiplexed signals that would be transmitted to the optical network terminal using the cyclic frames during the time cycles of the storing time period during a time cycle that is subsequent to the storing time period, and when the optical network terminal transmits the time-division multiplexed signals received from the optical line terminal to the user terminal, the optical network terminal transmits the time-division multiplexed signals in a continuous periodic manner using the cyclic frames by temporally storing the signals of the time-division multiplexed signals which are transmitted from the optical line terminal during the time cycle that is subsequent to the storing time period, sequentially transmitting the signals of the time-division multiplexed signals that are transmitted from the optical line terminal during the time cycle that is subsequent to the storing time period, and during the ranging, transmitting to the user terminal signals of the time-division multiplexed signals which were transmitted from the optical line terminal before the storing time period.

6. The optical access system according to claim 5, wherein the ranging is performed periodically.

7. An optical network terminal connected to a user terminal and an optical line terminal, the optical network terminal transmitting to the user terminal time-division multiplexed signals transmitted from the network connected to the optical line terminal and received via the optical line terminal, wherein the optical network terminal receives the time-division multiplexed signals from the optical line terminal using cyclic frames, the optical network terminal performs a ranging during a ranging time period for measuring a distance between the optical line terminal and the optical network terminal, and when the optical network terminal transmits the time-division multiplexed signals received from the network via the optical line terminal to the user terminal, the optical network terminal transmits the time-division multiplexed signals in a continuous periodic manner using the cyclic frames by temporally storing signals of the time-division multiplexed signals which are transmitted from the optical line terminal during a time cycle that is subsequent to a storing time period that includes the ranging time period and that is either equal to or longer than the ranging time period and which would be transmitted from the optical line terminal during time cycles of the storing period using the cyclic frames, sequentially transmitting the signals of the time-division multiplexed signals that are transmitted from the optical line terminal during the time cycle that is subsequent to the storing time period, and, during the ranging, transmitting to the user terminal signals of the time-division multiplexed signals which were transmitted from the optical line terminal before the storing time period.

8. The optical network terminal according to claim 7, wherein the ranging is performed periodically.

* * * * *